March 21, 1933. L. E. LA BRIE 1,902,455
BRAKE
Filed Jan. 30, 1928
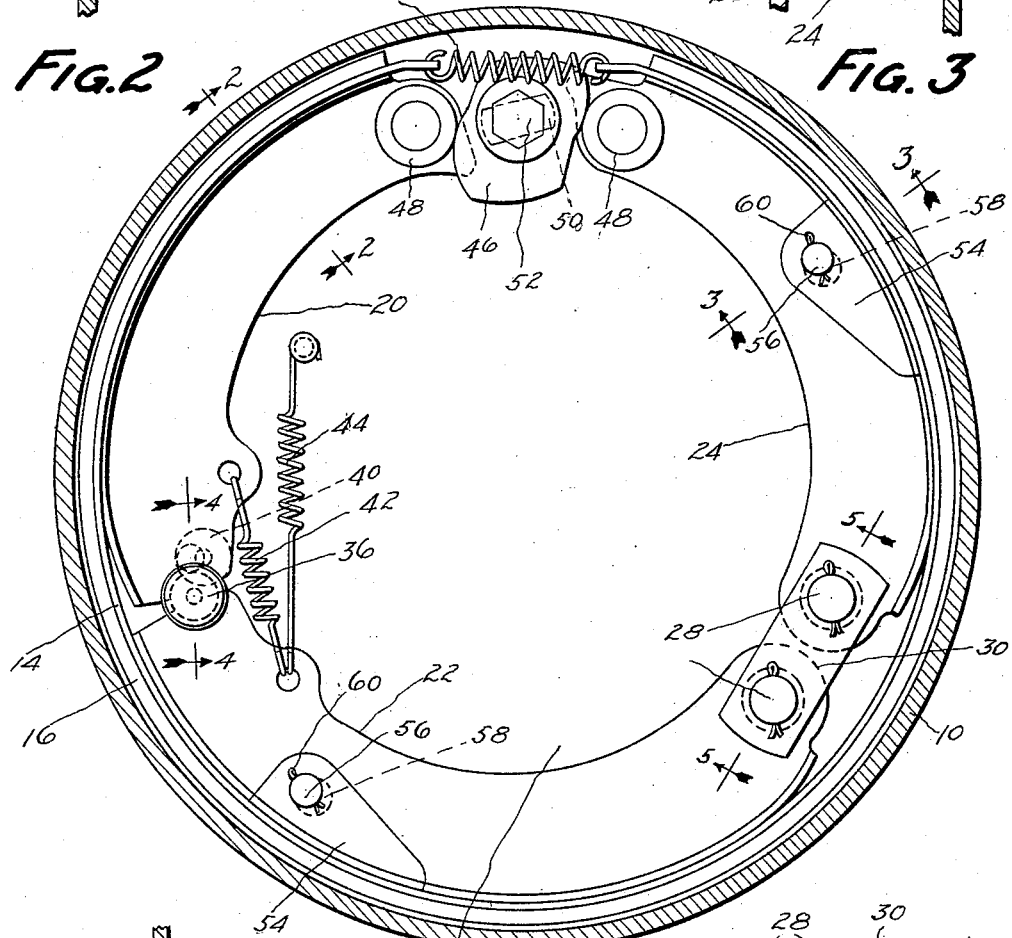
INVENTOR
LUDGER E. LA BRIE
BY
M. W. McConkey
ATTORNEY Patented Mar. 21, 1933

1,902,455

UNITED STATES PATENT OFFICE

LUDGER E. LA BRIE, OF SOUTH BEND, INDIANA, ASSIGNOR TO BENDIX BRAKE COMPANY, OF SOUTH BEND, INDIANA, A CORPORATION OF ILLINOIS

BRAKE

Application filed January 30, 1928. Serial No. 250,353.

This invention relates to brakes, and is illustrated as embodied in a novel internal expanding automobile brake. An object of the invention is to provide a simple and very powerful brake which can be built economically in large quantities.

One important feature of the invention relates to expanding a friction band or the like against a rotating brake drum, by means such as a series of pivoted rigid shoes. Preferably there are at least three shoes, two being anchored and the third operatively acting on one of the anchored shoes. I prefer that the torque of the friction band should be taken by the shoes which operate it, for example by transverse pins carried by the band and extending through openings formed in the shoes. In the illustrated embodiment, the band anchors on one of the anchored shoes when the drum is turning in one direction and on the other of the anchored shoes when the drum is turning in the other direction.

Other features of novelty relate to the structure of the band and shoes, to a simplified connection between the floating shoe and one of the anchored shoes, and to other novel and desirable constructions and arrangements which will be apparent from the following description of the illustrative embodiment shown in the accompanying drawing, in which:

Figure 1 is a vertical section through the brake, just inside the head of the brake drum, and showing the friction means of the brake in side elevation;

Figure 2 is a partial section on the line 2—2 of Figure 1, showing the structure of one of the shoes and its relation to the band;

Figure 3 is a partial section on the line 3—3 of Figure 1, showing one of the anchorages of the band;

Figure 4 is a partial section on the line 4—4 of Figure 1, showing the joint between the floating shoe and one of the anchored shoes; and Figure 5 is a partial section on the line 5—5 of Figure 1, showing the anchorage of the shoes.

In the arrangement illustrated, the brake includes a rotatable drum 10, at the open side of which is a stationary support such as a backing plate 12, and within which is arranged the novel friction means of the brake.

The drum-engaging element of the friction means is preferably in the form of an expansible flexible steel band 14, to which suitable friction brake lining 16 may be riveted or otherwise secured. This band is normally contracted, to withdraw it from the brake drum, by means such as a spring 18 tensioned between the adjacent ends of the band.

The above-described band is preferably expanded, to apply the brake, by means engaging its inner face, and illustrated as including three rigid pivoted brake shoes 20, 22, and 24. Each of the shoes is built up by riveting or welding together, back to back, two steel stampings L-shaped in cross-section. These stampings are shown (Figures 2 and 3) as formed to leave, at their line of engagement, a groove extending lengthwise of the shoe, in which is seated a rib 26 rolled or otherwise formed in the band 14. This positions the band positively crosswise of the shoes.

Shoes 22 and 24 are preferably pivoted on fixed anchors 28 carried by the backing plate 12, and which may reinforce each other through the medium of connecting plates 30, 32, and 34. Shoes 20 and 22 are formed, at their adjacent ends, with half-bearings embracing a connecting pivot thrust member 36, shown as having an end flange 38 engaging a grooved eccentric stop 40. A spring 42 tensioned between the ends of shoes 20 and 22 serves to hold both shoes against the thrust member 36, while an auxiliary spring 44, connected to the backing plate and to one of the shoes, serves to hold shoe 22 in the released position determined by stop 40 until the spring 44 is overcome by movement of shoe 20 during the application of the brake.

Shoes 20 and 24 are forced apart to apply the brake, against the resistance of spring 18, by means such as one or a pair of cams 46 engaging rollers 48 on the shoe ends, the cams preferably being formed with slots 50 embracing a flattened portion of a camshaft 52, so that the cams can shift to balance the thrusts on the two shoes.

According to an important feature of the invention, the torque of band 14 or its equivalent is taken by the above-described shoes, preferably by shoe 22 when the drum is turning clockwise (vehicle moving backward), and by shoe 24 when the drum is turning counter-clockwise (vehicle moving forward). To this end, the band is provided with brackets or fittings 54, extending inwardly and carrying transverse anchor pins 56 extending through slots 58 in the shoes 22 and 24. Means such as cotter pins 60 may be provided to prevent movement of pins 56 endwise. The fittings or brackets 54 are illustrated as L-section stampings spot-welded to the inner face of band 14.

While one illustrative embodiment of the invention has been described in detail, it is not my intention to limit its scope to that particular embodiment, or otherwise than by the terms of the appended claims.

I claim:

1. A brake comprising, in combination, a drum, a flexible friction band, a plurality of shoes engaging said band and arranged to force the band against the drum, an applying device engaging said shoes, said band being arranged to anchor on one of the shoes when the drum is turning in one direction and on a different shoe when the drum is turning in the other direction, and a return spring for contracting the band bridging across the applying device.

2. A brake comprising, in combination, a drum, at least two pivoted shoes, and a band having lost-motion connection with said two shoes approximately midway of their length and expanded against the drum by said shoes.

3. A brake comprising, in combination, a drum, at least two pivoted shoes, and a band having pin-and-slot connection with said two shoes and expanded against the drum by said shoes.

4. A brake including at least two shoes, each formed with a slot, a band encircling the shoes, and two pins operatively connected to the band and extending crosswise through the respective slots in the shoes.

5. A brake including at least two shoes, each formed with an opening approximately midway of its length, a band encircling the shoes, and two pins operatively connected to the band and extending crosswise through the respective openings in the shoes.

6. A brake comprising a substantially rigid shoe having a groove extending lengthwise of its face, in combination with a separately-formed band having a longitudinal rib seated in said groove.

7. A brake comprising a substantially rigid shoe including two pressed-metal parts secured together in such a manner as to form a groove extending lengthwise of the face of the shoe, in combination with a separately-formed band having a longitudinal rib seated in said groove.

8. A brake comprising, in combination, a drum, a band having adjacent ends and expansible against the drum, spring means for contracting the band, a pair of anchored shoes engaging the inside of said band, a third shoe operatively acting on one of said pair of shoes, and brake-applying means acting on the third shoe and the other of the pair of shoes to move all three shoes outwardly to force the band against the drum.

9. A brake comprising, in combination, a drum, a band having adjacent ends and expansible against the drum, spring means for contracting the band, a pair of anchored shoes engaging the inside of said band, a third shoe operatively acting on one of said pair of shoes, brake-applying means acting on the third shoe and the other of the pair of shoes to move all three shoes outwardly to force the band against the drum, and means for transmitting the braking torque of the band to said shoes.

10. A brake comprising, in combination, a drum, a band having adjacent ends and expansible against the drum, spring means for contracting the band, a pair of anchored shoes engaging the inside of said band, a third shoe operatively acting on one of said pair of shoes, brake-applying means acting on the third shoe and the other of the pair of shoes to move all three shoes outwardly to force the band against the drum, and means for transmitting the braking torque of the band to one of said shoes when the drum is turning in one direction and to another of said shoes when the drum is turning in the other direction.

11. A brake comprising, in combination, a drum, a band having adjacent ends and expansible against the drum, spring means for contracting the band, a pair of anchored shoes engaging the inside of said band, a third shoe operatively acting on one of said pair of shoes, brake-applying means acting on the third shoe and the other of the pair of shoes to move all three shoes outwardly to force the band against the drum, and means for transmitting the braking torque of the band to one of said anchored shoes when the drum is turning in one direction and to the other of said anchored shoes when the drum is turning in the other direction.

12. An expansible brake band having spaced parts projecting from its inner face, and an anchor pin transversely mounted in said parts.

13. A brake comprising, in combination, a drum, a pair of anchored shoes and a floating shoe acting on at least one of the anchored shoes and which three shoes are arranged within the drum, the floating shoe and one of the anchored shoes having adjacent ends which are separable to apply the brake, and a friction band arranged between the shoes and the drum and encircling the shoes and which is applied by the shoes and which has separable ends adjacent the separable ends of the shoes and which anchors at one end on one shoe when the drum is turning in one direction and at the other end on a different shoe when the drum is turning in the other direction.

14. A brake comprising, in combination, a drum, a pair of anchored shoes and a floating shoe acting on at least one of the anchored shoes and which three shoes are arranged within the drum, the floating shoe and one of the anchored shoes having adjacent ends which are separable to apply the brake, and a friction band arranged between the shoes and the drum and encircling the shoes and which is applied by the shoes and which has separable ends adjacent the separable ends of the shoes and which anchors at one end on one of the anchored shoes when the drum is turning in one direction and on the other of the anchored shoes when the drum is turning in the other direction.

15. A brake comprising a substantially rigid arcuate shoe having a longitudinal groove in its outer face, in combination with a band shiftable lengthwise over said outer face and provided with a rib seated in said groove.

16. A brake comprising a substantially rigid arcuate shoe and a band having a rib-and-groove connection extending lengthwise of the shoe and preventing relative lateral movement of the shoe and band while permitting relative lengthwise movement of the shoe and band.

17. A brake comprising a substantially rigid arcuate shoe and a band having a rib-and-groove connection extending lengthwise of the shoe, said shoe and band having stop means limiting relative lengthwise movement of the shoe and band at least in one direction.

18. A friction band for a brake having a projecting rib extending lengthwise of its inner face and provided with inwardly-extending stop projections.

19. A brake comprising, in combination, an operating shoe, a friction band shiftable over the outer face of the shoe and having inwardly-projecting parts on opposite sides of said shoe, and a one-way connection between the shoe and said parts.

20. A brake comprising, in combination, an operating shoe, a friction band shiftable over the outer face of the shoe and having inwardly-projecting parts on opposite sides of said shoe, and a pin-and-slot connection between the shoe and said parts.

21. A brake comprising, in combination, a drum, shoes within the drum having adjacent ends which are separable to apply the brake, and a friction band arranged between the shoes and the drum and encircling the shoes and which is applied by the shoes and which has separable ends adjacent the separable ends of the shoes and which has members intermediate its ends for anchoring the friction band on one shoe when the drum is turning in one direction and on a different shoe when the drum is turning in the other direction.

22. A brake comprising, in combination, a drum, shoes within the drum having adjacent ends which are separable to apply the brake, and a friction band arranged between the shoes and the drum and encircling the shoes and which is applied by the shoes and which has separable ends adjacent the separable ends of the shoes and which has spaced members intermediate its ends for anchoring the friction band on one shoe when the drum is turning in one direction and on a different shoe when the drum is turning in the other direction.

In testimony whereof, I have hereunto signed my name.

LUDGER E. LA BRIE.